Rooney & Renshaw.
Inkstand.
Nº 27,739.    Patented Apr. 3, 1860.

Witnesses:
John Crumly
Thos. P. How

Inventors:
Cornelius Joseph Rooney,
David Renshaw

UNITED STATES PATENT OFFICE.

C. J. ROONEY AND DAVID RENSHAW, OF NEW YORK, N. Y.

PEN-STAND.

Specification of Letters Patent No. 27,739, dated April 3, 1860.

*To all whom it may concern:*

Be it known that we, CORNELIUS J. ROONEY and DAVID RENSHAW, of New York, in the county of New York and State of New York, have invented an Improvement in Pen-Stands or Pen-Rests, the construction and operation of which we have described in the following specification and illustrated in its accompanying drawings with sufficient clearness to enable competent and skillful workmen in the arts to which it pertains or is most nearly allied to make and use our invention.

Our said invention consists in a series of cups the interior of which is conical in shape or larger at the top than lower down, and open at the bottom, arranged in a rack or other appropriate support in combination with a corresponding series of cups arranged below them to catch the drippings of the pens, the upper or lower cups or both being removable to allow them to be taken out of the stand for the purpose of cleaning the cups as hereinafter more fully set forth.

Figure 2:
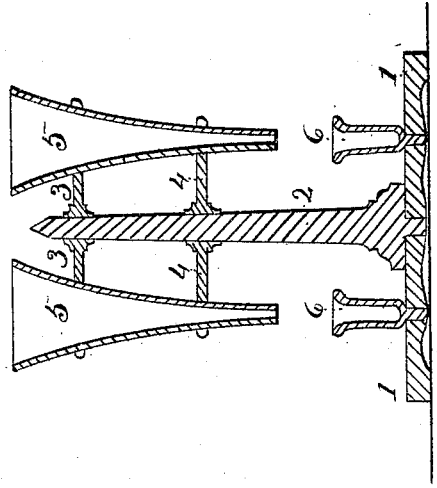
Figure 1:
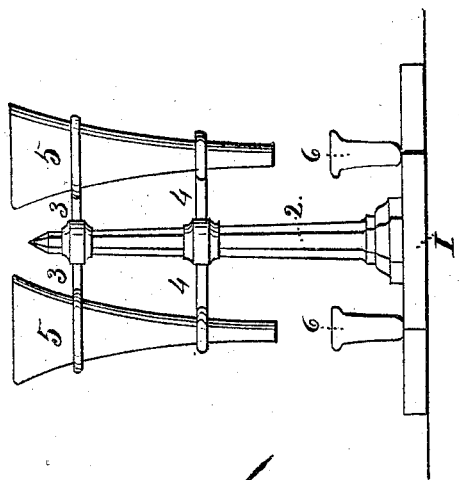

In the accompanying drawings, Figure 1 is a side elevation of our pen stand or pen rest. Fig. 2 is a sectional elevation of it showing the parts beyond the center, the plane of projection being parallel to that of Fig. 1.

1, is the base of the stand from the center of which a column 2, rises to support the arms 3, and 4, which have apertures at *a* in their outer ends to support the funnel shaped cups 5, 5. These cups we prefer to make of glass, though any other material which taste or economy dictates may be used. The form of these cups is very clearly indicated in the drawings, though this may also be slightly varied within certain limits keeping in view the necessity to make them sufficiently funnel shaped or conical to cause them to receive and retain the pens in a nearly upright position and support them without allowing them to rest upon the points. These cups it will be observed are open at the botom to allow the ink which may drip from the pens to fall through so as not to retain it in contact with the pen and thus gum up the points so as to prevent the easy flow of the ink therefrom. These cups 5, 5, we generally make and place in the stand in such a manner as to make them readily removable for the purpose of cleaning.

A series of cups 6, 6, are set in the base of the stand directly beneath the cups 5, 5, for the purpose of catching the ink that may fall from the points of the pens. These we also prefer to set into the stand in such a manner as to be easily removable.

It is indispensable that either the cups 5, 5, or the cups 6, 6, should be removable, or else the operation of cleaning the lower cups cannot be performed with any sort of reasonable facility. It is obvious that the form or design of the stand may be changed to suit almost any taste or convenience, the arrangement of the two series of cups being still retained, and the advantages of this arrangement of two series of cups still be realized. The same arrangement of cups may be attached to an inkstand if desired.

The arrangement above described protects the point of the pen from injury; furnishes a convenient support for the pen in which it is easily and conveniently deposited, and in which it is supported in the most convenient possible position to be laid hold of when necessary. The position of the pen when thus supported causes the ink to flow to the point of the pen thereby keeping it moist and in a condition fit for writing, while at the same time any ink that may fall from it falls through the opening in the bottom of the cup 5, into the cup 6, directly below, and is there retained in a position where it can do no harm and is easily removed when necessary.

Having thus fully described our said invention, we claim—

The pen stand or pen rest described, made by arranging the series of converging or conical and open bottomed cups 5, 5, over the series of cups 6, 6, one or both of these series of cups being so attached as to be readily removable to facilitate the cleaning of the lower cups substantially as and for the purpose set forth.

CORNELIUS JOSEPH ROONEY.
DAVID RENSHAW.

Witnesses:
JOHN CRUMLY,
THOS. P. HOW.